United States Patent [19]

Noda et al.

[11] Patent Number: 5,447,990

[45] Date of Patent: Sep. 5, 1995

[54] METHOD OF PREPARING POLYMER CONTAINING FUNCTIONAL GROUP

[75] Inventors: Kouji Noda, Yokohama; Yoshikuni Deguchi, Kobe; Masakazu Isurugi, Kyoto; Naoki Furukawa, Himeji, all of Japan

[73] Assignee: Kanegaruchi Kagaku Kogyo Kabushiki Kaisha, Osaka, Japan

[21] Appl. No.: 357,202

[22] Filed: Dec. 13, 1994

[30] Foreign Application Priority Data

Dec. 14, 1993 [JP] Japan ................................. 5-313593

[51] Int. Cl.⁶ .............................................. C08F 8/00
[52] U.S. Cl. .................................... 525/106; 525/100; 525/333.7; 525/342
[58] Field of Search ........................ 525/100, 106, 342

[56] References Cited

U.S. PATENT DOCUMENTS

| | | | |
|---|---|---|---|
| 3,691,257 | 9/1972 | Kendrick et al. | 525/106 |
| 3,920,714 | 11/1975 | Streck | 525/106 |
| 3,929,850 | 12/1975 | Streck et al. | 525/106 |
| 4,593,072 | 6/1986 | Keogh | 525/106 |
| 4,808,664 | 2/1989 | Saam | 525/106 |
| 5,010,137 | 4/1991 | Umeda et al. | 525/106 |
| 5,049,616 | 9/1991 | Blizzard et al. | 525/106 |

*Primary Examiner*—Bernard Lipman
*Attorney, Agent, or Firm*—Armstrong, Westerman Hattori, McLeland & Naughton

[57] ABSTRACT

A method of preparing a polymer containing functional groups by reacting a polymer (A) having alkenyl groups with less than 1/N mole ratio with respect to the mole number of the alkenyl group of a silicon polyhydride compound (B) having 2 to 6 hydrogen-silicon bonds in one molecule, so as to increase the molecular weight and leaving unreacted alkenyl groups remain in molecules, or if desired, by adding the silane compound (C) in the reaction system so as to react the silane compound with the remaining alkenyl group in one-point process.

18 Claims, No Drawings

METHOD OF PREPARING POLYMER CONTAINING FUNCTIONAL GROUP

BACKGROUND OF THE INVENTION

1. Field of the Invention

The present invention relates to a method of preparing a polymer containing functional groups by reacting a polymer containing alkenyl groups with a silicon polyhydride compound.

2. Description of the Related Art

Conventionally, the molecular weight of a polymer containing functional groups obtained by a transformation of functional group is determined by the molecular weight of the polymer used as its raw material. Since the molecular weight between chemical crosslinks is equal to the molecular weight of the starting polymer. Therefore, in the case where a polymer containing functional groups is made to serve as a curable composition utilizing its functional group, the properties of the product polymer obtained are inevitably restricted according to the molecular weight of starting material.

For example, for preparation of a polymer containing a plurality of alkenyl groups in one molecule from a polyisobutylene serving as a starting polymer, methods disclosed in U.S. Pat. No. 4,316,973, Jap. Pat. Appln. KOKAI Publications Nos. 63-105005 and 4-103606 and the like, can be considered. However, in any of these methods, a polyisobutylene is prepared by the cationic polymerizing method for isobutylene monomers in a solvent (inifer method). However, when the molecular weight of the polymer obtained by the polymerization is excessively high, polymer is precipitated out from the polymerization system, thus resulting in an ununiformal reaction. Therefore, in practice, the molecular weight can only be achieved up to 5,000 to 10,000 at most.

In the meantime, for preparation of a polymer containing a plurality of silyl groups in one molecule, methods disclosed in Jap. Pat. Appln. KOKAI Publications Nos. 63-006003 and 1-197509 and the like, can be considered. However, the starting polymer is a polymer containing alkenyl groups in each of the these publications, and therefore it is difficult to prepare an oligomer having a molecular weight of higher than 10,000 for the same reason as indicated above. Even if an oligomer having a molecular weight of 10,000 or more is prepared, the molecular-weight distribution will be broader due to the ununiformity of the reaction, which is caused by the precipitation of the polymer, which is caused by the separating of oligomer, and the introduction of functional groups such as alkenyl groups cannot be completely performed.

Further, if the molecular weight exceeds 10,000, the viscosity of the obtained oligomer increases remarkably. As a result, the pumping out and transfer of a product, which follows the completion of the purification and concentration step after polymerization, cannot be performed or easily carried out, creating a problem of a low workability.

In the case where such a polymer is used as a curable composition, the usage of the product is limited because of the lack of elongation. This lack of extensibility is caused by the fact that the molecular weight between chemical crosslinks after curing is low when the molecular weight is 10,000 or less.

SUMMARY OF THE INVENTION

The present invention has been proposed in consideration of the above-described circumstances. In order to solve the above problem, the inventors of the present invention carried out intensive studies, and focused on the hydrosilylating reaction and also on the fact that a polymer containing functional groups to be prepared by the present invention, when it is used in the field of industry, is rarely used as it is, but rather often as an industrial product after being blended with a plasticizer or the like in a blending process (in accordance with the usage of the product).

The object of the present invention is to provide a method of preparing a polymer containing functional groups, which is capable of reducing the viscosity of the produced polymer, facilitating the taking off step and transfer step of the polymer, and omitting a solvent recovering step.

The above-mentioned object of the present invention are achieved by the method specified below:

(1) A method of preparing a polymer containing functional groups, comprising the step of reacting a polymer component (A) having at least 1.1 alkenyl groups per one molecule, and having a saturated hydrocarbon main-chain, with a silicon polyhydride compound component (B) having 2 to 6 hydrogen-silicon bonds and having 2 to 20 silicon atoms per one molecule, so that an amount of the silicon polyhydride compound component (B) with respect to a molar number of all the alkenyl groups in the polymer component (A), is made less than 1/N in terms of molar ratio, where N represents the average number of hydrogen-silicon bonds contained in one molecule of the silicon polyhydride compound component (B), thereby increasing a molecular weight of a product polymer and leaving unreacted alkenyl groups in a molecule of the product polymer.

(2) A method of preparing a polymer containing functional groups, comprising the steps of reacting a polymer component A having at least 1.1 alkenyl groups per one molecule and having a saturated hydrocarbon main-chain, with a silicon polyhydride compound component (B) having 2 to 6 hydrogen-silicon bonds and having 2 to 20 silicon atoms per one molecule, so that an amount of the silicon polyhydride compound component (B) with respect to a molar number of all the alkenyl groups in the polymer component (A), is made less than 1/N in terms of molar ratio, where N represents the average number of hydrogen-silicon bonds contained in one molecule of the silicon polyhydride compound (B), thereby increasing a molecular weight of a product polymer and leaving unreacted alkenyl groups in a molecule of the product polymer, and further adding a silane compound component (C) represented by the following formula to the reaction system, thereby reacting the silane compound component (C) with the remaining unreacted alkenyl groups in a molecule of the product polymer,

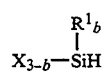

wherein $R^1$ represents a substituted or unsubstituted organic group having 1 to 20 carbon atoms, and may be the same or different, X is a group or an atom selected from the group consisting of halogen atoms, alkoxy group, acyloxy group, ketoxymate group and alkenyloxy group, when two or more Xs are present, they may be the same or different, and b is an integer of either 0, 1 or 2.

DETAILED DESCRIPTION OF THE PREFERRED EMBODIMENTS

The present invention will now be described in detail.

Polymers used in the present invention, which contain at least 1.1 alkenyl group in one molecule which is component (A), and the main-chain of which is made of saturated hydrocarbon, may be of any type of polymer as long as the polymers contain an alkenyl group having a hydrosilylating activity which can induce a hydrosilylating reaction between components (B) and (C). The number of alkenyl groups present in one molecule is at least 1.1, and the preferable number is up to about 10.0. Specific examples of the alkenyl group are vinyl group and allyl group, and those existing in the form of allylether group, or the alkenyl group may be located at a terminal or an arbitrary position of a molecule chain. Polymers having an average molecular weight of 500-200,000 may be used in the present invention, the preferable average molecular weight is 1,000-100,000, and more preferably 5,000-50,000. Further, the preparation method of the polymer is not particularly limited either, but the present invention is applicable for any of polymers prepared by an arbitrary preparation method.

The main-chain made of saturated hydrocarbon of the polymer which is the component (A) of the present invention, may be a linear or branched, and though it is not particularly limited, preferable main-chains are those prepared by polymerization of unsaturated hydrocarbons. Polymers whose main-chains are made of saturated hydrocarbon are preferable because each of them has a high heat resistance and a high weathering resistance, in consideration of the industrial usage value of the polymer containing functional groups prepared by the method of the present invention. Of these polymers, those having principal chains made of polyisobutylene containing isobutylene as a repeating unit, or hydrogenated polybutadiene, or hydrogenated polyisoprene are particularly preferable. Each of polymers having those principal chains has a relatively high viscosity at room temperature and entails the above mentioned problem. Therefore, those polymers are particularly suitable for achieving the object of the present invention.

In particular, when the polymer containing functional groups prepared by the method of the present invention is applied by taking advantage of the feature thereof as a crosslinkable polymer, the properties of the crosslinked material needs to be controlled. Consequently, it is possible starting polymer having a higher molecular weight exhibits better properties (high elongation and the like) than the one having lower molecular weight. As a result, the initial viscosity of the polymer may be a real problem. In such a case, the advantage of the present invention is further conspicuous.

The component (B) used in the present invention is a silicon polyhydride compound which has 2 to 20 silicon atoms and contains 2 to 6 hydrogen-silicon bonds in one molecule. Specific examples thereof are organopolysiloxane polyhydride or a silicon-hydride-substituted organic hydrocarbon compound which does not contain a polysiloxane bond.

The organopolysiloxane compound is present in the form of an arbitrary structure, such as linear, branched, ladder-like or circular. Preferable examples of the organo group are monovalent hydrocarbon groups having 1 to 12 carbons, selected from the group consisting of alkyl group, aryl group, halogenated alkyl group, cyanoalkyl group and the like. A silicon polyhydride compound having two or more hydrogen-silicon bonds can be used solely or in the form of mixture. Further, a good result can be obtained when a silicon dihydride compound is solely used or a mixture of a silicon dihydroxide and a silicon trihydroixe is used. This is because the number of silicon hydride compounds greatly exceeds 2-3 in average, not only the molecular weight is increased, but also gelation is likely to occur due to three-dimensional crosslinking or the like.

Specific examples of the silicon polyhydride compound of the component (B) of the present invention are, preferably, 1,1,3,3-tetramethyldisiloxane, 1,1,1,3,5,7,7,7-octamathyltetrasiloxane, 1,1,3,3-tetraethyldisiloxane, 1,1,1,3,5,7,7,7-octaethyltetrasiloxane, 1,1,3,3-tetraphenyldisiloxane, 1,1,1,3,5,7,7,7-octaphenyltetrasiloxane,

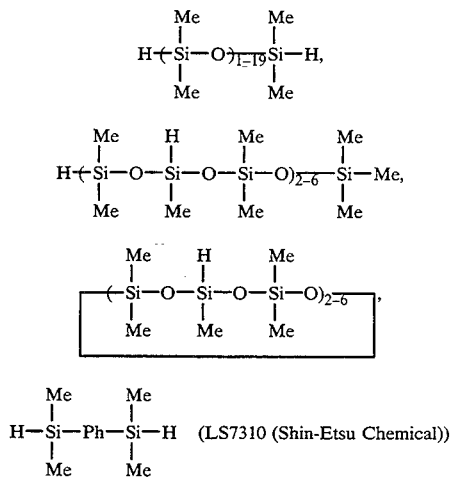

however the compound is not limited to those listed above.

When a polymer of the component (A) and a silicon polyhydride compound of the component (B) are made to react with each other, thus increasing the molecular weight, and a polymer containing functional groups having unreacted alkenyl groups remaining in the molecule is prepared, the amount of the silicon polyhydride of the component (B) should be set less than 1/N mole with respect to the mole number of all the alkenyl groups contained in the polymer of the component (A), where N represents the average number of hydrogen-silicon bonds in one molecule of the silicon polyhydride compound of the component (B), or the average number of hydrogen-silicon bonds when a mixture of two or more silicon polyhydride compounds of the component (B), which has different numbers of the bonds in one molecule is used.

When the molecular weight of the resultant thus obtained is increased, and a silane compound of the component (C) is added to the reaction system including a polymer containing functional groups having unreacted alkenyl groups remaining in a molecule, so as to continue the reaction, the remaining alkenyl groups and the hydrogen-silicon bonds of the silane compound react with each other, thus obtaining a polymer containing functional groups. This reaction takes place in one-point process and therefore is preferable.

The silane compound of the component (C) used in the present invention is represented by the following formula:

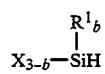

wherein $R^1$ represents a substituted or unsubstituted organic group having 1 to 20 carbon atoms, and may be the same or different, X is a group or an atom selected from the group consisting of halogen atoms, alkoxy group, acyloxy group, ketoxymate group and alkenyloxy group, when two or more Xs are present, they may be the same or different, and b is an integer of either 0, 1 or 2.

Specific examples of the silane compound are silane halides such as trichlorsilane, methyldichlorsilane, dimethylchlorsilane, and trimethylsiloxydichlorsilane; alkoxysilanes such as trimethoxysilane, triethoxysilane, methyldimethoxysilane, dimethylmethoxysilane, phenyldimethoxysilane, and 1,3,3,5,5,7,7- heptamethyl-1,1-dimethoxytetrasiloxane; acyloxysilanes such as methyldiacetoxysilane and trimethylsiloxymethylacetoxysilane; ketoxymate silanes such as bis(dimethylketoxymate)methylsilane, bis(cyclohexylketoxymate)methylsilane, bis(diethylketoxymate)trimethylsiloxysilane; and alkenyloxysilanes including methyldi(isopropenyloxy)silane; however the silane compound is not limited to those listed above.

Of these compounds, chlorsilanes such as trichlorsilane and methyldichlorsilane are preferable for their high reactivities in the hydrosilation, whereas alkoxysilanes such as trimethoxysilane and methyldimethoxysilane are preferable in terms of the mildness of the hydrolyric properties of the polymer containing functional groups obtained.

The amount of use of the component (C) is not particularly limited; however it should preferably be in a range of 1.0-3.0 moles with respect to the mole number of the remaining alkenyl groups in the polymer of the component (A).

It is preferable that a hydrosilation catalyst is used for the reaction between the components (A) and (B) and/or the reaction between the components (A), (B) and (C). An arbitrary hydrosilylating catalyst can be used, and all the known catalysts can be used. Specific examples thereof are a simple substance of platinum, a substance in which solid platinum is supported on a carrier of alumina, silica, carbon black or the like, chloroplatinic acid, a complex of chloroplatinic acid and alcohol, aldehyde, ketone or the like, a platinum-olefin complex (for example, $Pt(CH_2=CH_2)_2$ $(PPh_3)_2Pt(CH_2=CH_2)_2Cl_2$), a platinum-vinylsiloxane complex (for example, $Pt_n(ViMe_2SiOSiMe_2Vi)_m$), $Pt[(MeViSiO)_4]_m$), a platinum-phosphin complex (for example, $Pt(PPh_3)_4$, $Pt(PBu_3)_4$), a platinum-phosphato complex (for example, $Pt[P(OPh)_3]_4$), (where Me represents a methyl group, Bu represents a butyl group, Vi represents a vinyl group, Ph represents a phenyl group, and m and n represent integers), dicarbonyldichloroplatinum, a platinum-hydrocarbon composite disclosed in U.S. Pat. Nos. 3,159,601 and 3,159,662 of Ashby, and a platinum alcoholate catalyst disclosed in U.S. Pat. No. 3,220,972 of Lamoreaux. Further, a platinum chloride-olefin composite disclosed in the U.S. Pat. No. 3,516,946 of Modic is useful for the present invention.

Other examples of the catalyst than the platinum compounds, are $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$ and $TiCl_4$.

These catalysts may be used either singly or in the form of a combination of two or more. In consideration of the catalytic activity, chloroplatinic acid, platinum-olefin complex, a platinum-acetylacetonato complex and a platinum-vinylsiloxane complex are preferable.

The amount of the catalyst used is not particularly limited; however the amount should be in a range of $10^{-1}$ to $10^{-8}$ mole per mole of alkenyl group of the component (A), preferably in a range of $10^{-3}$ to $10^{-6}$. If the amount is less than $10^{-8}$, the hydrosilylation may not fully proceed. As hydrosilation catalysts are generally expensive and some of them have corrosive properties, the amount of the catalyst should be less than $10^{-1}$. And if the amount exceeds $10^{-1}$ or more, hydrogen gas is generated which leads a foaming of cured material.

It is preferable that a plasticizer should be present in the reactions involved in the present invention, the reaction between the components (A) and (B) and/or the components (A), (B) and (C). The plasticizer should be selected on the basis of a high compatibility with the polymer of the component (A), a relatively high boiling point and a property of not blocking the hydrosilylating reaction. As long as such conditions are satisfied, the type of the plasticizer is not limited.

For example, in the case where the principal chain of the polymer of the component (A) is made of a saturated hydrocarbon such as polyisobutylene, hydrogenated polybutadiene or hydrogenated polyisoprene, preferable examples of the plasticizer are hydrocarbon compounds such as polybutene, hydrogenated polybutene, oligo-α-methylstyrene, biphenyl, triphenyl, triaryldimethane, alkylenetriphenyl, liquid polybutadiene, hydrogenated liquid polybutadiene and alkyldiphenyl; adipate ester-series compounds such as BAA-1 (Daihachi Chemical), P-103, W320 (Dainippon Ink and Chemicals) and PN-150 (Adeka Argus Chemical), trimellitate ester series compounds such as TOTM, TITM (New Japan Chemical) and W-700 (Dainihon Ink); petrolic process-oils such as NS-100, NM-26, NP-24 and PS-32 (Idemitsu Kosan); Alken-68 (Nippon Petroleum Detergent), BF-1000 (Adeka Argus Chemical), KE-828 (Arakawa Chemical), DOTP (New Japan Chemical). Among them, Alken-68, PS-32, DOTP, NS-100, TOTM and the like are particularly preferable since each of them has a particularly small weight loss during heat process; however the plasticizer is not limited to those listed above. It should be noted that the type of an appropriate plasticizer naturally changes in accordance with the above-described selection standards as the principal chain of the polymer of the component (A) changes.

The amount of the plasticizer used is appropriately determined based on the viscosity desired, and the entire amount of the plasticizer used as a polymer containing functional groups, and more specifically, the amount should preferably be, for example, about 10-100 parts by weight with respect to the polymer of the component (A).

The polymer containing functional groups obtained by the method of the present invention is used as a material for, for example, glue, adhesive, binder, paint, sealing agent, waterproofing agent, embossing agent, potting rubber agent and spray agent.

EXAMPLES

The present invention will now be described in detail with reference to examples; however it is not limited to the following examples.

Example 1

10 g of bi-functional isobutylene polymer which has vinyl groups at both end at a ratio of about 90% and has a molecular weight of about 8,000, and 10 ml of n-heptane were weighed and added into a four-necked flask, and both materials were mixed and heated at a temperature of about 65° C., thus preparing a uniform solution.

Next, 109 mg of dihydrosilane (LS7310, Shin-etsu Chemicals) was added to the solution, and after mixing, 5.4 μL of a platinum-vinylsiloxane complex solution (xylene solution: $8.3 \times 10^{-5}$ mmol/μL (converted in terms of Pt): $Pt_n(ViMe_2SiOSiMe_2Vi)_m$) was added to the mixture. While the resultant was stirred at about 65° C., it was observed the elimination of SiH absorption at around 2150 cm$^{-1}$ by FT-IR. The elimination of the absorption of SiH occurred in about 15 minutes. Further, after the reaction was continued for 30 minutes, the solvent was distilled out, and the obtained oligomer was analyzed by H-NMR and GPC. The results were as listed in Table 1 below. It should be noted that NMR-Mn value is the calculated molecular weigh based on integral ratio of peak area represented by (repeating units)/(inifer). On the other hand, GPC-Mn is the one determined by GPC after calibration with polystyrene standards. NMR-Fn (vinyl) is the average number of vinyl group contained in one molecule and is determined by the integral ratio of (vinyl group)/(inifer).

TABLE 1

|  | Starting polymer | Reaction Products |
| --- | --- | --- |
| NMR-Mn | 8,000 | 16,000 |
| NMR-Fn (vinyl) | 1.80 | 1.60 |
| GPC-Mn | 7,100 | 12,400 |
| Viscosity (poise (23° C.)) | 8,000 | 24,000 |

Example 2

10 g of bi-functional isobutylene polymer which has vinyl groups at both end at a ratio of about 90% and has a molecular weight of about 8,000, and 10 ml of n-heptane were weighed and added into a four-necked flask, and both materials were mixed and heated at a temperature of about 65° C., thus preparing a uniform solution.

Next, 109 mg of dihydrosilane (LS7310, Shin-etsu Chemicals) was added to the solution, and after mixing, 5.4 μL of a platinum-vinylsiloxane complex solution (xylene solution: $8.3 \times 10^{-5}$ mmol/μL (converted in terms of Pt) : $Pt_n(ViMe_2SiOSiMe_2Vi)_m$) was added to the mixture, while the resultant was stirred at about 65° C., it was observed the elimination of SiH absorption at around 2150 cm$^{-1}$ by FT-IR. The elimination of the absorption of SiH occurred in about 15 minutes. Further, after the reaction was continued for 30 minutes, 300 mg of methyldimethoxysilane was further added, and the reaction was continued under the same conditions for another 6 hours. Then, the solvent was distilled out, and the obtained oligomer was analyzed by H-NMR and GPC. The results were as listed in Table 2 below. It should be noted that NMR-Fn (silyl) is the content of silyl group contained in one molecule determined by NMR analysis.

TABLE 2

|  | Starting polymer | Reaction Products |
| --- | --- | --- |
| NMR-Mn | 8,000 | 16,000 |
| NMR-Fn (silyl) | 1.80 | 1.45 |
| GPC-Mn | 7,100 | 13,100 |
| Viscosity (poise (23° C.)) | 8,000 | 27,000 |

Example 3

10 g of bi-functional isobutylene polymer which has vinyl groups at both end at a ratio of about 90% and has a molecular weight of about 8,000, and 6 g of plasticizer PS-32 (Petrolic processed oil of Idemitsu Kosan) were weighed and added into a four-necked flask, and both materials were mixed and heated at a temperature of about 65° C., thus preparing a uniform solution.

Next, 109 mg of dihydrosilane (LS7310, Shin-etsu Chemicals) was added to the solution, and after mixing, 5.4 μL of a platinum-vinylsiloxane complex solution (xylene solution: $8.3 \times 10^{-5}$ mmol/μL (converted in terms of Pt): $Pt_n(ViMe_2SiOSiMe_2Vi)_m$) was added to the mixture. While the resultant was stirred at about 65° C., it was observed the elimination of SiH absorption at around 2150 cm$^{-1}$ by FT-IR. The elimination of the absorption of SiH occurred in about 20 minutes. Further, after the reaction was continued for 40 minutes, the vacuum degassing was carried out, and the obtained oligomer was analyzed by H-NMR. The results were as listed in Table 3 below. It should be noted that NMR-Mn value and NMR-Fn value were calculated out with the correction of subtracting the absorption of the plasticizer. This applies the following Example 4 or Table 5.

TABLE 3

|  | Starting polymer | Reaction Products |
| --- | --- | --- |
| NMR-Mn | 8,000 | 14,800 |
| NMR-FN (vinyl) | 1.80 | 1.70 |
| Viscosity (poise (23° C.)) | 8,000 | 700 |

Example 4

10 g of bi-functional isobutylene polymer which has vinyl groups at both end at a ratio of about 90% and has a molecular weight of about 8,000, and 6 g of plasticizer PS-32 (Petrolic processed oil of Idemitsu Kosan) were weighed and added into a four-necked flask, and both materials were mixed and heated at a temperature of about 65° C., thus preparing a uniform solution.

Next, 109 mg of dihydrosilane (LS7310, Shin-etsu Chemicals) was added to the solution, and after mixing, 5.4 μL of a platinum-vinylsiloxane complex solution (xylene solution: $8.3 \times 10^{-5}$ mmol/μL (converted in terms of Pt): $Pt_n(ViMe_2SiOSiMe_2Vi)_m$) was added to the mixture. While the resultant was stirred at about 65° C., it was observed the elimination of SiH absorption at around 2150 cm$^{-1}$ by FT-IR. The elimination of the absorption of SiH occurred in about 15 minutes. Further, after the reaction was continued for 30 minutes, 300 mg of methyldimethoxysilane was further added, and the reaction was continued under the same conditions for another 6 hours. Then, excessive silane compounds were distilled out, and the obtained oligomer was analyzed by H-NMR. The results were as listed in Table 4 below.

TABLE 4

|  | Starting polymer | Reaction Products |
|---|---|---|
| NMR-Mn | 8,000 | 15,100 |
| NMR-Fn (silyl) | 1.80 | 1.55 |
| Viscosity (poise (23° C.)) | 8,000 | 800 |

As is clear from the results listed in Table 1 (Example 1) and TABLE 3 (Example 3), the molecular amount can be increased and controlled by use of dihydrosilane, and products having a molecular weight of twice as much as starting polymer can be obtained as designed.

Further, as is clear from the results listed in TABLE 2 (Example 2) and TABLE 4 (Example 4), a hydrolyzable silyl group can be introduced in one-point process, following the molecular weight jump reaction by dihydrosilane, and a polymer containing functional groups is easily obtained.

As is clear from the comparison of the results listed in Table 1 (Example 1) and the results listed in Table 3 (Example 3), and the comparison of the results listed in Table 2 (Example 2) and the results listed in Table 4 (Example 4), respectively, an increase in the viscosity after the reaction can be suppressed by adding a plasticizer to the reaction system, and therefore the pumping out of the product and transfer thereof, which are carried out in later steps, can be simplified.

Comparative Example 1

10 g of bi-functional isobutylene polymer which has vinyl groups at both end at a ratio of about 90% and has a molecular weight of about 8,000, and 6 g of plasticizer PS-32 (Idemitsu Kosan) were weighed and added into a four-necked flask, and both materials were mixed and heated at a temperature of about 65° C., thus preparing a uniform solution.

Next, 360 mg of methyldimethoxysilane was added to the solution under a nitrogen atmosphere, and after mixing, 5.4 μL of a platinum-vinylsiloxane complex solution (xylene solution: $8.3 \times 10^{-5}$ mmol/μL (converted in terms of Pt) : $Pt_n(ViMe_2SiOSiMe_2Vi)_m$) was added to the mixture. The resultant was stirred at about 65° C., and the reaction was completed. After that, the vacuum distillation was carried out, and an oligomer having a hydrolyzable silyl group obtained.

Comparative Example 2

Comparative Example 2 was carried out in the same manner as in Comparative Example 1 except that 10 ml of n-heptane was used as a solvent instead of plasticizer.

The results of the analysis of the oligomers obtained in Comparative Examples 1 and 2 by means of H-NMR were as listed in Table 5 below.

TABLE 5

|  | Starting polymer | Comp. Ex. 1 | Comp. Ex. 2 |
|---|---|---|---|
| NMR-Mn | 8,000 | 8,100 | 8,200 |
| NMR-Fn (silyl) | 1.80 | 1.65 | 1.62 |
| Viscosity (poise (23° C.)) | 8,000 | 400 | 8,500 |

Example 5

100 parts by weight of each of the hydrolyzable silyl group-containing oligomers obtained in Examples 2 and 4 and Comparative Examples 1 and 2 was mixed with 3 parts by weight of tin octylate, 0.75 parts by weight of laurylamine, and 1 part by weight of water, respectively. Then, each mixture was supplied into a open frame with a thickness of 1 mm, and cured for four days at room temperature, and then for four days at 50° C.

With regard to each of the samples, a sheet of cured product which is uniform and transparent, and has a low tack was obtained. Each of the sheets of cured products was subjected to a tensile strength test based on JIS-5754. The results were as shown in Table 6 below. In the table 6, M50 represents a stress at 50% elongation ($kg/cm^2$), M100 represents a stress at 100% elongation ($kg/cm^2$), TB represents a tensile strength at breakage ($kg/cm^2$), and EB represents an elongation to break (%).

TABLE 6

| Starting oligomer | Example 2 | Comparative Example 2 | Example 4 | Comparative Example 1 |
|---|---|---|---|---|
| M50 | 0.8 | 1.5 | 0.5 | 1.1 |
| M100 | 1.6 | 3.3 | 1.1 | 2.3 |
| TB | 5.1 | 4.9 | 4.9 | 4.6 |
| EB | 325 | 153 | 415 | 205 |

As is clear from the results shown in Table 6, high elongation of a desired cured product can be achieved by increasing the molecular weight before crosslinking, and a similar effect was observed in the case where a plasticizer was used.

Further, with regard to all the samples, cured products which are uniform and transparent, and have low tacking abilities, and therefore it was confirmed that the introducing reaction of a hydrolyzable silyl functioning group surely occurred.

As described above, according to the present invention, it is to provide a method of preparing a polymer containing functional groups by means of molecular weight jump reaction by reacting polymer containing alkenyl groups with a silicone polyhydride compound. Silicone compounds can be introduced at polymer ends in one-pot reaction. As this type of reaction can be carried out in the presence of plasticizer, significant problems driven by the visocity may be solved.

What is claimed is:

1. A method of preparing a polymer containing functional groups, comprising the step of reacting a polymer component (A) having at least 1.1 alkenyl groups per one molecule, and having a saturated hydrocarbon main-chain, with a silicon polyhydride compound component (B) having 2 to 6 hydrogen-silicon bonds and having 2 to 20 silicon atoms per one molecule, so that an amount of said silicon polyhydride compound component (B) with respect to a molar number of all the alkenyl groups in said polymer component (A), is made less than 1/N in terms of molar ratio, where N represents the average number of hydrogen-silicon bonds contained in one molecule of said silicon polyhydride compound component (B), thereby increasing a molecular weight of a product polymer and leaving unreacted alkenyl groups in a molecule of the product polymer.

2. The method according to claim 1, wherein the reaction is performed in the presence of a plasticizer.

3. The method according to claim 1, wherein said main-chain of polymer component (A) consist of a repeating unit of isobutylene monomers.

4. The method according to claim 1, wherein said main-chain of polymer component (A) is hydrogenated polybutadiene or hydrogenated polyisoprene.

5. The method according to claim 2, wherein said main-chain of polymer component (A) is hydrogenated polybutadiene or hydrogenated polyisoprene.

6. The method according to claim 1, wherein said silicon polyhydride compound component (B) is a silicon dihydride compound.

7. The method according to claim 2, wherein said silicon polyhydride compound component (B) is a silicon dihydride compound.

8. The method according to claim 3, wherein said silicon polyhydride compound component (B) is a silicon dihydride compound.

9. The method according to claim 4, wherein said silicon polyhydride compound component (B) is a silicon dihydride compound.

10. The method according to claim 5, wherein said silicon polyhydride compound component (B) is a silicon dihydride compound.

11. A method of preparing a polymer containing functional groups, comprising the steps of reacting a polymer component (A) having at least 1.1 alkenyl groups per one molecule and having a saturated hydrocarbon main-chain, with a silicon polyhydride compound component (B) having 2 to 6 hydrogen-silicon bonds and having 2 to 20 silicon atoms per one molecule, so that an amount of said silicon polyhydride compound component (B) with respect to a molar number of all the alkenyl groups in said polymer component (A), is made less than 1/N in terms of molar ratio, where N represents the average number of hydrogen-silicon bonds contained in one molecule of said silicon polyhydride compound component (B), thereby increasing a molecular weight of a product polymer and leaving unreacted alkenyl groups in a molecule of the product polymer, and further adding a silane compound component (C) represented by the following formula to the reaction system, thereby reacting said silane compound component (C) with said remaining unreacted alkenyl groups in a molecule of said product polymer,

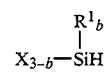

wherein $R^1$ represents a substituted or unsubstituted organic group having 1 to 20 carbon atoms, and may be the same or different, x is a group or an atom selected from the group consisting of halogen atoms, alkoxy group, acyloxy group, ketoxymate group and alkenyloxy group, when two or more Xs are present, they may be the same or different, and b is an integer of either 0, 1 or 2.

12. The method according to claim 11, wherein said reaction is performed in the presence of a plasticizer.

13. The method according to claim 1, wherein said main-chain of polymer component (A) is hydrogenated polybutadiene or hydrogenated polyisoprene.

14. The method according to claim 12, wherein said main-chain of polymer component (A) is hydrogenated polybutadiene or hydrogenated polyisoprene.

15. The method according to claim 11, wherein said silicon polyhydride compound component (B) is a silicon dihydride compound.

16. The method according to claim 12, wherein said silicon polyhydride compound component (B) is a silicon dihydride compound.

17. The method according to claim 13, wherein said silicon polyhydride compound component (B) is a silicon dihydride compound.

18. The method according to claim 14, wherein said silicon polyhydride compound component (B) is a silicon dihydride compound.

* * * * *